(12) United States Patent
Wright

(10) Patent No.: US 11,607,952 B1
(45) Date of Patent: Mar. 21, 2023

(54) METHODS AND SYSTEMS FOR CONTROLLING DIFFERENTIAL WHEEL SPEEDS OF MULTI- INDEPENDENT-WHEEL DRIVE VEHICLES

(71) Applicant: DIMAAG-AI, Inc., Fremont, CA (US)

(72) Inventor: Ian Wright, Woodside, CA (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 17/661,982

(22) Filed: May 4, 2022

(51) Int. Cl.
*B60K 17/356* (2006.01)
*B60K 7/00* (2006.01)
*B60W 10/08* (2006.01)

(52) U.S. Cl.
CPC .......... *B60K 17/356* (2013.01); *B60K 7/0007* (2013.01); *B60W 10/08* (2013.01)

(58) Field of Classification Search
CPC .... B60W 10/08; B60K 17/356; B60K 7/0007
See application file for complete search history.

(56) References Cited

U.S. PATENT DOCUMENTS

| | | | | |
|---|---|---|---|---|
| 6,904,993 B1* | 6/2005 | Rinck | ................... | B60K 28/165 180/242 |
| 8,630,770 B2 | 1/2014 | Matsumoto | .......... | B62D 7/1509 701/41 |
| 8,662,212 B2* | 3/2014 | Lawson, Jr. | ........... | B62D 11/04 180/6.48 |
| 9,174,549 B2* | 11/2015 | Ichinose | ............... | B60W 10/08 |
| 9,834,214 B2* | 12/2017 | Fukudome | ................ | B60L 7/14 |
| 10,046,643 B2* | 8/2018 | Nakatsu | .............. | B60L 15/2009 |
| 10,099,559 B2* | 10/2018 | Mogi | ................... | B60L 15/2036 |
| 10,202,114 B2* | 2/2019 | Lian | ...................... | B60W 10/08 |
| 10,232,839 B2* | 3/2019 | Yang | ........................ | B60K 6/52 |
| 10,543,818 B2* | 1/2020 | Lian | ...................... | B60W 30/04 |
| 10,933,875 B2* | 3/2021 | Suzuki | ............... | B60W 30/045 |
| 11,370,414 B2* | 6/2022 | Takei | ................... | B60W 10/22 |

(Continued)

OTHER PUBLICATIONS

Davies, Chris; Four Reasons Quad-Motor EVs should Excite You, Dec. 27, 2019, Retrieved from the Internet: https://west.appcoll.com/RefDetails.aspx?groupid=28860&plid=9848310.

(Continued)

*Primary Examiner* — Jacob B Meyer
*Assistant Examiner* — Maurice L Williams
(74) *Attorney, Agent, or Firm* — Polygon IP, LLP

(57) ABSTRACT

Described herein are methods and systems for controlling differential wheel speeds of multi-independent-wheel vehicles, such as four-wheel-drive electric tractors (4WD-ETs). Specifically, a method comprises determining a target speed for each wheel of the vehicle based on at least the steering input. The linear travel speeds (corresponding to these target speeds) of any two wheels are different when the vehicle turns (steering input deviates from a no-steering baseline) or the same when the vehicle travels in a straight line (steering input is at the no-steering baseline). Each target wheel speed is then used to control the rotational speed of the corresponding electric motor, which independently drives one of the vehicle's wheels. This process of determining the target wheel speeds and independently controlling all electric motors is frequently repeated such that the vehicle can be propelled through the turn at the desired speed with minimal wheel slip.

20 Claims, 9 Drawing Sheets

(56) References Cited

U.S. PATENT DOCUMENTS

| | | | |
|---|---|---|---|
| 2004/0176899 A1* | 9/2004 | Hallowell | B60W 30/02 |
| | | | 701/84 |
| 2004/0204803 A1* | 10/2004 | Matsuda | B60L 50/11 |
| | | | 903/906 |
| 2006/0015231 A1* | 1/2006 | Yoshimura | B60L 3/0076 |
| | | | 701/1 |
| 2006/0015236 A1* | 1/2006 | Yamaguchi | B60K 17/358 |
| | | | 180/242 |
| 2009/0000839 A1* | 1/2009 | Ishii | B62D 11/04 |
| | | | 701/41 |
| 2010/0174463 A1* | 7/2010 | Uragami | B60W 40/112 |
| | | | 701/70 |
| 2011/0295457 A1* | 12/2011 | Linda | B60T 8/172 |
| | | | 701/498 |
| 2014/0379220 A1* | 12/2014 | Lee | B60W 10/18 |
| | | | 701/41 |
| 2016/0243943 A1* | 8/2016 | Sugai | B60L 15/2009 |
| 2019/0233034 A1* | 8/2019 | Viele | B62D 59/04 |
| 2019/0248354 A1* | 8/2019 | Andrea | H02K 7/006 |
| 2020/0047735 A1* | 2/2020 | Niu | B60W 10/06 |
| 2021/0046827 A1* | 2/2021 | Greenwood | B60L 15/20 |
| 2021/0310203 A1* | 10/2021 | Berning | E01C 23/127 |
| 2021/0402982 A1* | 12/2021 | Verbridge | B60W 10/08 |
| 2022/0041058 A1* | 2/2022 | Nemeth | B60W 10/18 |
| 2022/0041170 A1* | 2/2022 | Nishihashi | B60T 8/3215 |
| 2022/0194354 A1* | 6/2022 | Li | B60W 10/26 |

OTHER PUBLICATIONS

De Novellis, Leonardo et al,; Torque Vectoring for Electric Vehicles with Individually Controlled Motors: State-of-the-Art and Future Developments, World Electric Vehicle Journal vol. 5, 2012, pp. 617-627.

* cited by examiner

METHODS AND SYSTEMS FOR CONTROLLING DIFFERENTIAL WHEEL SPEEDS OF MULTI- INDEPENDENT-WHEEL DRIVE VEHICLES

BACKGROUND

Propelling a vehicle through a turn can be challenging since each wheel has a different linear/rotational speed. Furthermore, most vehicles have one motor, which requires a system for distributing the power to the drive wheels (e.g., arranged on one or more drive axles). A conventional approach uses a differential on each drive axle. The differential allows the wheels of this axle to rotate at different speeds while the torque is being transferred to the wheels. The most common differential is an open differential, which delivers an equal torque to both wheels connected to this differential. However, when the traction of one of these two wheels is limited (e.g., the wheel is separated from the road or hits an ice patch), this wheel starts spinning while the torque to the other wheel is reduced.

To address this problem, some offroad vehicles use a locking differential, which forces both wheels to rotate at the same speed. As such, the applied torque may be zero at one wheel and very large at the other wheel, depending on the traction with the road. However, the same rotation speed requirement of the locking differential forces the wheels to slip relative to the road when the vehicle turns, which in turn causes traction issues. As a result, locking differentials are mainly used for off-roading when speeds are minimal.

While various mechanical traction systems have been proposed (e.g., using brakes to counter the applied torque), these systems have various drawbacks. Furthermore, mechanical systems cause various levels of power losses and/or have a slow response time to road-changing conditions.

What is needed are new methods and systems for controlling differential wheel speeds of multi-independent-wheel drive vehicles such, as four-wheel-drive electric tractors (4WD-ETs), using a separately-controlled electric motor to drive each wheel at an individual speed determined for specific driving conditions.

SUMMARY

Described herein are methods and systems for controlling differential wheel speeds of multi-independent-wheel vehicles, such as four-wheel-drive electric tractors (4WD-ETs). Specifically, a method comprises determining a target speed for each wheel of the vehicle based on at least the steering input. The linear travel speeds (corresponding to these target speeds) of any two wheels are different when the vehicle turns (steering input deviates from a no-steering baseline) or the same when the vehicle travels in a straight line (steering input is at the no-steering baseline). Each target wheel speed is then used to control the rotational speed of the corresponding electric motor, which independently drives one of the vehicle's wheels. This process of determining the target wheel speeds and independently controlling all electric motors is frequently repeated such that the vehicle can be propelled through the turn at the desired speed with minimal wheel slip.

In some examples, a method of controlling individual wheel speeds in a four-wheel-drive electric tractor comprising a wheel-speed controller and multiple wheel assemblies is provided. The method comprises receiving a steering input at the wheel-speed controller and determining, at the wheel-speed controller, a target wheel speed for each of the multiple wheel assemblies, based on the steering input. Each of the multiple wheel assemblies comprises a wheel and an electric motor rotating the wheel independently from any other of the multiple wheel assemblies. The target wheel speed has a corresponding linear travel speed for each of the multiple wheel assemblies. The corresponding linear travel speed of any two of the multiple wheel assemblies is different when the steering input deviates from a no-steering baseline. The corresponding linear travel speed of any two of the multiple wheel assemblies is the same when the steering input is at the no-steering baseline. The method also comprises transmitting the target wheel speed to each of the multiple wheel assemblies.

In some examples, the steering input is a steering wheel angle, provided by a steering angle sensor. In the same or other examples, the four-wheel-drive electric tractor can be an autonomous vehicle comprising an autonomous driving system, providing the steering input.

In some examples, the method further comprises receiving a speed input at the wheel-speed controller, wherein the target wheel speed for each of the multiple wheel assemblies is further determined based on the speed input. The speed input is one or more of an accelerator pedal position, an accelerator lever position, and an autonomous-driving-system speed input.

In some examples, the target wheel speed and the corresponding linear travel speed are the same. Alternatively, the target wheel speed is a rotational speed. The wheel in the first one of the multiple wheel assemblies has a first diameter ($D_1$). The wheel in a second one of the multiple wheel assemblies has a second diameter ($D_2$) different from the first diameter ($D_1$). The target wheel speed of the first one of the multiple wheel assemblies is further determined based on the first diameter ($D_1$). The target wheel speed of the second one of the multiple wheel assemblies is further determined based on the second diameter ($D_2$). In some examples, the steering input is at the no-steering baseline, a product of the first diameter ($D_1$) and the target wheel speed of the first one of the multiple wheel assemblies is the same as a product of the second diameter ($D_2$) and the target wheel speed of the second one of the multiple wheel assemblies.

In some examples, the four-wheel-drive electric tractor has a track width (TW) and a wheelbase (WB). The target wheel speed for each of the multiple wheel assemblies is further determined based on the track width and the wheelbase of the four-wheel-drive electric tractor when the steering input deviates from the no-steering baseline. In more specific examples, the four-wheel-drive electric tractor comprises a front steerable axle, a rear non-steerable axle separated by the wheelbase (WB), and a vehicle turn point positioned at the center of the rear non-steerable axle and associated with a desired speed of the four-wheel-drive electric tractor. When the steering input deviates from the no-steering baseline, the four-wheel-drive electric tractor turns around the turn center defined by a turning radius ($R_T$) extending between the turn center and the vehicle turn point. The front steerable axle comprises a front inner wheel and a front outer wheel offset from the front inner wheel by the track width (TW) and positioned further away from the turn center than the front inner wheel. The rear non-steerable axle comprises a rear inner wheel and a rear outer wheel offset from the rear inner wheel by the track width (TW) and positioned further away from the turn center than the rear inner wheel. The turning radius ($R_T$) is a function of the track width, the wheelbase, and the steering input.

In some examples, the turning radius ($R_T$) is defined by a formula $R_T = 0.5\ TW + WB/\tan(\alpha)$, where a is the turn angle of the front inner wheel, corresponding to the steering input. In more specific examples, the speed differential ($SD_{RI}$) of the rear inner wheel is defined as a ratio of the corresponding linear travel speed of the rear inner wheel to the desired speed of the four-wheel-drive electric tractor is defined by a formula $SD_{RI} = 1 - 0.5\ TW/R_T$. The speed differential ($SD_{RO}$) of the rear outer wheel is defined as a ratio of the corresponding linear travel speed of the rear outer wheel to the desired speed of the four-wheel-drive electric tractor is defined by a formula $SD_{RO} = 1 + 0.5\ TW/R_T$. The speed differential ($SD_{FI}$) of the front inner wheel is defined as a ratio of the corresponding linear travel speed of the front inner wheel to the desired speed of the four-wheel-drive electric tractor is defined by a formula $SD_{FI} = (\sqrt{((R_T - 0.5\ TW)^2 + WB^2)})/R_T$. The speed differential ($SD_{FO}$) of the front outer wheel is defined as a ratio of the corresponding linear travel speed of the front outer wheel to the desired speed of the four-wheel-drive electric tractor is defined by a formula $SD_{FO} = (\sqrt{((R_T + 0.5\ TW)^2 + WB^2)})/R_T$.

In some examples, each of the speed differential ($SD_{RI}$) of the rear inner wheel, the speed differential ($SD_{RO}$) of the rear outer wheel, the speed differential ($SD_{FI}$) of the front inner wheel, and the speed differential ($SD_{FO}$)) of the front outer wheel has a non-linear relationship to the steering input. In the same or other examples, the profile of the speed differential ($SD_{RO}$)) of the rear outer wheel as a function of the steering input has a minimum defined by the track width (TW) and the wheelbase (WB) of the four-wheel-drive electric tractor.

In some examples, each of the multiple wheel assemblies further comprises a wheel-assembly controller receiving the target wheel speed from the wheel-speed controller. The wheel-assembly controller determines the operating conditions of each of the multiple wheel assemblies to achieve the target wheel speed. In more specific examples, the wheel-assembly controller monitors the rotational speed of the wheel and updates the operating conditions of the electric motor to achieve the target wheel speed. In some examples, the electric motor is an in-hub motor.

In some examples, receiving the steering input, determining the target wheel speed, and transmitting the target wheel speed are performed repeatedly at a set frequency. In more specific examples, the set frequency depends on at least one of the steering input and speed input.

In some examples, a four-wheel-drive electric tractor comprises multiple wheel assemblies, each comprising a wheel and an electric motor configured to rotate the wheel independently from any other of the multiple wheel assemblies. The four-wheel-drive electric tractor also comprises a wheel-speed controller configured to receive receiving a steering input, to determine a target wheel speed for each of the multiple wheel assemblies based on the steering input, and to transmit the target wheel speed to each of the multiple wheel assemblies. The target wheel speed has a corresponding linear travel speed for each of the multiple wheel assemblies. The corresponding linear travel speed of any two of the multiple wheel assemblies is different when the steering input deviates from a no-steering baseline. The corresponding linear travel speed of any two of the multiple wheel assemblies is the same when the steering input is at the no-steering baseline.

DETAILED DESCRIPTION

Figure 1A:
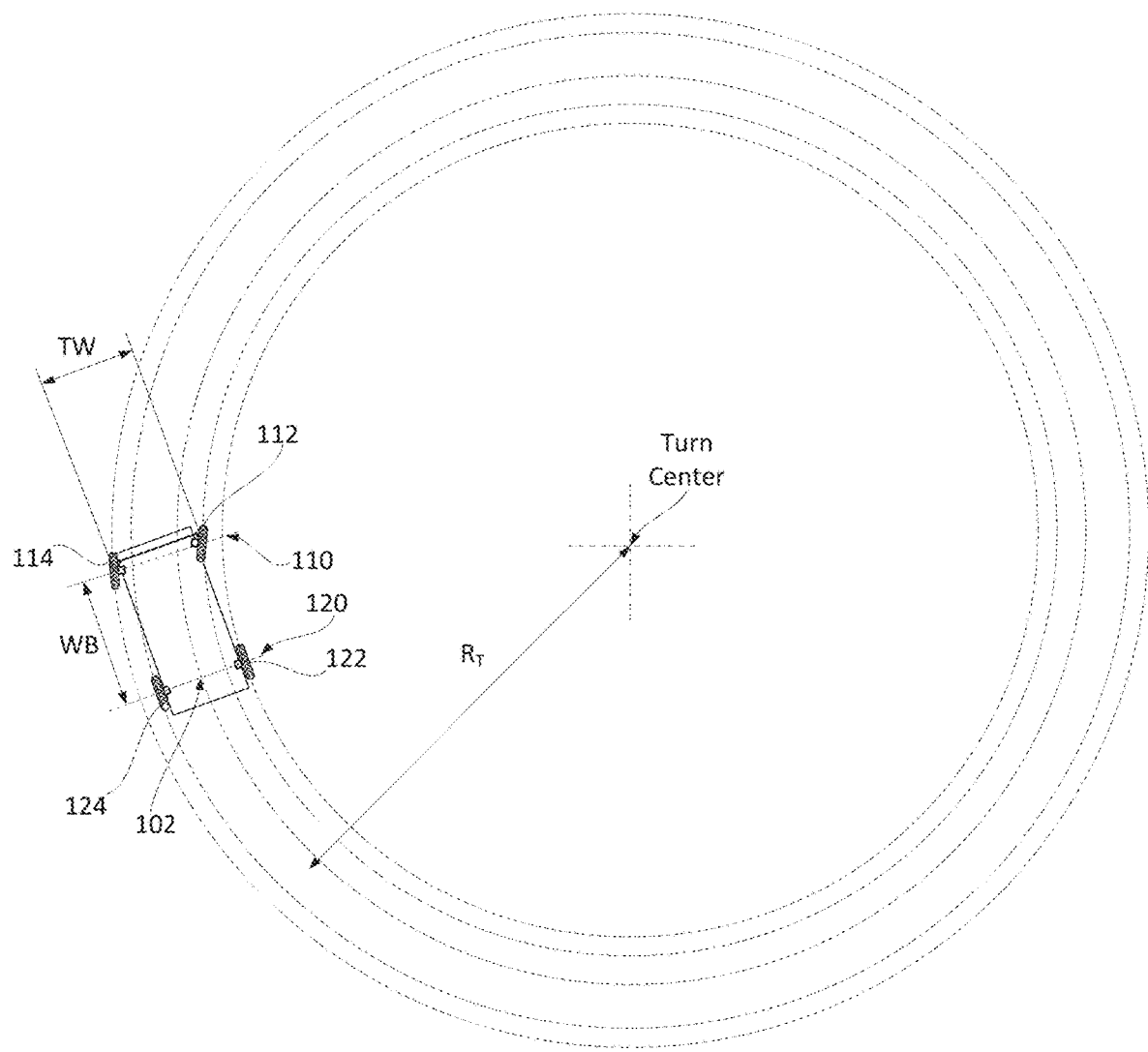
FIG. 1A is a schematic illustration of trajectories of the vehicle's four wheels and also the vehicle's turn point while the vehicle completes a constant turn, in accordance with some examples.

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

INTRODUCTION

As noted above, a typical vehicle has a single motor and multiple wheels and uses a differential to distribute from the motor to its drive wheels. For example, a two-wheel-drive vehicle has a single differential positioned on a driving axle (e.g., a front axle in a front-wheel-drive vehicle or a rear axle in a rear-wheel-drive vehicle). The input shaft of this differential is connected to the engine or, in some examples, to the gearbox, while each of the two output shafts is connected to a corresponding wheel (i.e., a left wheel and a right wheel). The most common differential type is an open differential, which is configured to deliver equal torque to the wheels on a given axle regardless of the wheel speeds. It should be noted that when a vehicle is turning, the wheel speeds of the inner and outer wheels (relative to the turn center), on the same axle, are different. However, the reduced traction of one wheel (e.g., slippery conditions) also reduces the torque applied to the other wheel, connected to the same differential.

Another differential type is a locking differential, which forces the wheels to rotate at the same speed. However, this same-speed configuration causes problems while the car turns, e.g., causing the wheels to slip relative to the road since the inner and outer wheels travel different distances in a turn. As a result, locking differentials are mainly used for off-roading applications where the vehicle speeds are minimal. It should be noted that a locking differential can be switched between an open-differential mode and a locked-differential mode. For example, a driver can select the mode based on the driving conditions. Finally, a conventional all-wheel-drive system may use another differential in the transfer case to distribute the torque between the two axles. Similar to axle differentials, the transfer case differential can be an open differential and/or a locking differential.

Tractors, in particular farming tractors, are special-purpose vehicles that travel at slow speeds and often on uneven grounds. Tractors typically require significant torque at their wheels (e.g., to pull various loads such as trailers and farming implements). Furthermore, tractors often need to be highly maneuverable and be able to turn in small turning radii, e.g., at the turning ends of the farming field. The sharp turns cause significant wheel speed differentials (e.g., differences in linear speeds of different tractor wheels). It should be noted that these speed differentials exist between inner and outer wheels as well as between front steerable wheels and rear non-steerable wheels. The relationship between wheel speed differentials and turn radius is described below with reference to FIGS. 1A-1B and 2A-2B.

In a conventional internal combustion engine (ICE) tractor, the transfer case does not contain a differential. As such, the torque is always transferred to both front and rear axles thereby ensuring that both axles get some power at all times. Furthermore, by eliminating one differential (i.e., the transfer case), the weight and cost of a tractor are reduced. However, the tractor's maneuverability is impacted since different rotational speeds are needed at different axles when the tractor turns. Specifically, the speed ratio between the front and rear axles remains the same regardless of the tractor's turning radius, while non-slip conditions require speed differentials between the front steerable and rear non-steerable axles to increase with the sharpness of the turn (i.e., as the turn radius decreases). As such, sharp turns can cause understeer (push) and a lot of wheel scrubbing. FIG. 1A illustrates that the front-steerable wheels of a vehicle have to travel further than the rear non-steerable wheel. Furthermore, if the front and/or rear differentials are also locked, such sharp turns become even harder because the inner wheel needs to rotate slower than the outer wheel (for non-slip conditions) due to the difference in linear travel as, e.g., is also schematically shown in FIG. 1A.

Some conventional tractors use gear shifting (e.g., two gear ratios) in a direct drive/transfer case between the front and rear axles. For example, one gear ratio is used for smaller steering angles (e.g., below 35°) during which the relative speed of the front and rear wheels are the same (referring to speeds corresponding to linear travel distances), while another gear ratio is used for larger steering angles (e.g., above 35°) during which the relative speed of the front wheels is faster than that of the rear wheels. Another approach is to pivot the whole front axle. Furthermore, some tractors have a selectable differential lock function on the rear axle only. In this example, the total tractive force is the sum of the tractive force delivered by each rear wheel, rather than two times the tractive force of the wheel with the least traction. While these approaches help to improve tractor maneuverability, the improvements are typically minimal while the mechanical complexity increases significantly.

Described herein are new methods and systems for controlling differential wheel speeds of multi-independent-wheel vehicles such as four-wheel-drive electric tractors (4WD-ETs). Each vehicle wheel is equipped with a dedicated electric motor that independently controls the speed of this wheel. All electric motors are centrally controlled based on speed differentials, which are determined based on at least the steering input. Using a separate/independent electric motor to drive each wheel (e.g., four electric motors on a four-wheel tractor) provides many new opportunities that were not available with single-motor configurations that require mechanical distribution of the torque. First, electric motors are capable of providing a much quicker torque response in comparison to an ICE motor. Furthermore, a separate electric motor, which is individually coupled to each wheel, provides independent and precise speed control of that wheel. These individual electric motors with a central wheel-speed controller collectively operate as an electronic differential and may be also referred to as an electronic differential lock with steering compensation.

A method of controlling individual wheel speeds comprises determining a target speed for each vehicle's wheel based on at least the steering input. The target speed corresponds to the linear travel speed of a wheel and can be a rotational wheel speed or a linear speed. The linear speed is independent of the wheel diameter, while the rotational speed is inverse proportional to the wheel diameter. In some examples, other inputs (e.g., trailer attachment) can be also used for additional wheel speed differentiation. For example, the linear travel speeds of any two wheels are different when the vehicle turns (steering input deviates from a no-steering baseline) or the same when the vehicle travels in a straight line (steering input deviates at the no-steering baseline). Specifically, when the vehicle turns, each wheel follows a different path having a different corresponding length, e.g., as schematically shown in FIG. 1A. FIG. 1A is a schematic illustration of 4WD-ET 100 completing a constant turn. 4WD-ET 100 comprises front steerable axle 110 and rear non-steerable axle 120 separated by the wheelbase (WB). Vehicle turn point 102 is defined as a point positioned at the center of rear non-steerable axle 120. Vehicle turn point 102 is associated with the desired speed of 4WD-ET 100 and can be also referred to as a vehicle speed reference point. For example, the turn of 4WD-ET 100 is defined by a turning radius ($R_T$) extending between the turn center and vehicle turn point 102. This turning radius ($R_T$) is a function of track width (TW), wheelbase (WB), and steering input. Specifically, a vehicle with a shorter wheelbase (WB) will have a smaller turning radius ($R_T$) than a vehicle with a longer wheelbase (WB). A larger angle of turning wheels will translate into a smaller turning radius ($R_T$). This relationship between the turning radius ($R_T$) and the track width (TW), wheelbase (WB), and steering input is further described below.

Returning to FIG. 1A, front steerable axle 110 comprises front inner wheel 112 and front outer wheel 114, which is offset from front inner wheel 112 by the track width (TW). For clarity, front outer wheel 114 is positioned further away from the turn center than front inner wheel 112. Rear non-steerable axle 120 comprises rear inner wheel 122 and rear outer wheel 124 offset from rear inner wheel 122 by the track width (TW) and positioned further away from the turn center than rear inner wheel 122. The trajectories of all four wheels are shown in FIG. 1A as four concentric circles. Specifically, rear inner wheel 122 follows the trajectory with the smallest radius, while front outer wheel 114 follows the trajectory with the largest radius. As such, different wheels need to have different linear speeds as 4WD-ET 100 is turning. These trajectories will now be described with reference to FIG. 1B.

Figure 1B:
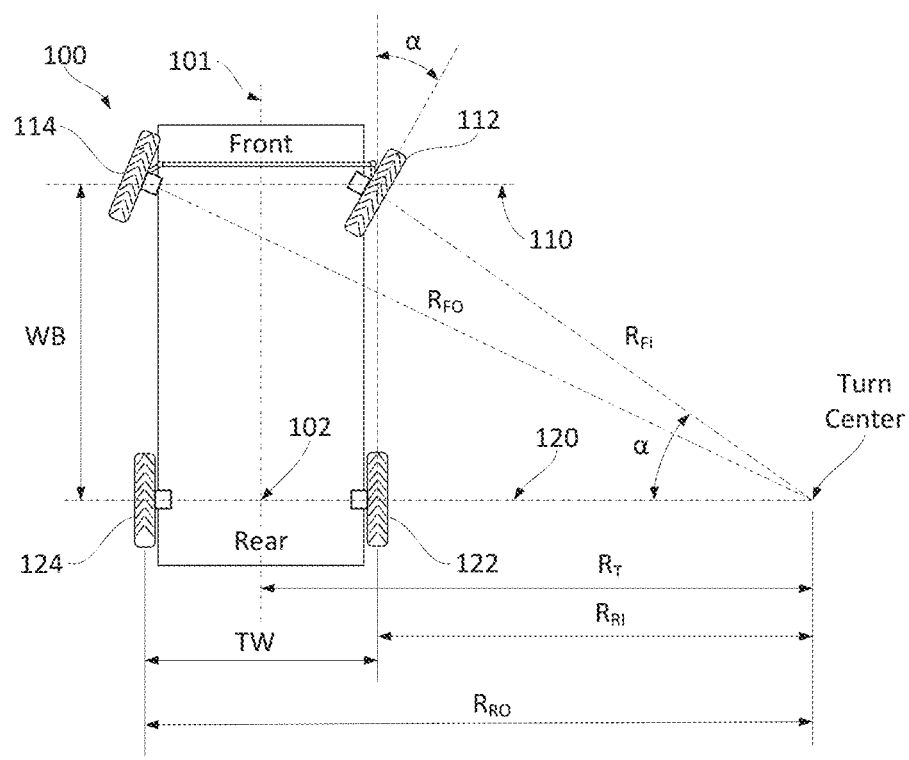
FIG. 1B is a schematic illustration of different dimensions related to the vehicle turn including the turn center, the turning radius, and the distance of each wheel from the turn center, in accordance with some examples.

Referring to FIG. 1B, the steering input corresponds to a certain turn angle (a) of the wheels on front steerable axle 110. For simplicity, the turn angle (a) is defined as an angle of front inner wheel 112 relative to the straight-driving position. The inner wheel is defined based on the position turn center (i.e., the inner wheel is closer to the turn center than the corresponding outer wheel). One having ordinary skills in the art would understand that front inner wheel 112 and front outer wheel 114 can be turned at slightly different angles because the track width (TW) translates into different distances of these wheels from the turn center.

Referring to the right triangle formed by front inner wheel 112, rear inner wheel 122, and the turn center in FIG. 1B, the following formula applies:

$$\tan(\alpha) = WB/R_{RI} = WB/(R_T - 0.5TW) \quad \text{Formula 1}$$

Rearranging this formula, the turning radius ($R_T$) can be found as a function of the track width (TW), wheelbase (WB), and steering input using the following formula:

$$R_T = 0.5TW + WB/\tan(\alpha) \quad \text{Formula 2}$$

It should be noted that the turning radius ($R_T$) corresponds to vehicle turn point 102 and also defines the distance traveled by vehicle turn point 102 while 4WD-ET 100 is turning (i.e., Travel=$\pi \times R_T$ for a full turn in a circle). As such, this turning radius ($R_T$) is proportional to the linear speed traveled by vehicle turn point 102. Furthermore, it should be noted that the linear speeds of all wheels are proportional to their respective distances from the turn center, which may be referred to as road wheel turning radii. Similar to the turning radius ($R_T$), each of these distances can be represented in terms of the track width (TW), wheelbase (WB), and steering input. Specifically, the distance between rear inner wheel 122 and the turn center is represented by the following formula:

$$R_{RI} = R_T - 0.5T \quad \text{Formula 3a}$$

$$R_{RI} = WB/\tan(\alpha) \quad \text{Formula 3b}$$

The distance between rear outer wheel 124 and the turn center is represented by the following formula:

$$R_{RO} = R_T + 0.5TW \quad \text{Formula 4a}$$

$$R_{RO} = WB/\tan(\alpha) + TW \quad \text{Formula 4b}$$

The distance between front inner wheel 112 and the turn center is represented by the following formulas:

$$R_{FI} = \sqrt{((R_T - 0.5TW)^2 + WB^2)} \quad \text{Formula 5a}$$

$$R_{FI} = \sqrt{(R_{RI}^2 + WB^2)} = \sqrt{((WB/\tan(\alpha))^2 + WB^2)} \quad \text{Formula 5b}$$

Finally, the distance between front outer wheel 114 and the turn center is represented by the following formula:

$$R_{FO} = \sqrt{(R_T^2 + 0.5TW^2 + WB^2)} \quad \text{Formula 6a}$$

$$R_{FO} = \sqrt{(R_{RO}^2 + WB^2)} = \sqrt{((WB/\tan(\alpha) + TW)^2 + WB^2)} \quad \text{Formula 6b}$$

Since these wheel turning radii are different, the linear speeds of different wheels will be different as well. These linear speed differences can be expressed as speed differentials. For purposes of this disclosure, a speed differential is defined as a ratio of the corresponding linear travel speed of this particular wheel to the linear speed traveled by vehicle turn point 102. The linear speed traveled by vehicle turn point 102 may be also referred to as the desired speed of 4WD-ET 100. Furthermore, since the linear travel speed of each wheel is proportional to the corresponding wheel turning radius, a speed differential can be calculated as a ratio of respective wheel radii. Specifically, the speed differential ($SD_{RI}$) of rear inner wheel 122 is defined as a ratio of corresponding linear travel speed 225 of rear inner wheel 122 to the desired vehicle speed is defined by the following formula:

$$SD_{RI} = R_{RI}/R_T = 1 - 0.5TW/R_T \quad \text{Formula 7a}$$

$$SD_{RI} = R_{RI}/R_T = WB/(\tan(\alpha) \times (0.5TW + WB/\tan(\alpha))) \quad \text{Formula 7b}$$

The speed differential ($SD_{FI}$) of rear outer wheel 124 is defined as a ratio of corresponding linear travel speed 225 of rear outer wheel 124 to the desired vehicle speed is defined by the following formulas:

$$SD_{FO} = R_{FO}/R_T = 1 + 0.5TW/R_T \quad \text{Formula 8a}$$

$$SD_{FO} = R_{RI}/R_T = WB/((\tan(\alpha) + TW) \times (0.5TW + WB/\tan(\alpha))) \quad \text{Formula 8b}$$

The speed differential ($SD_{FI}$) of front inner wheel 112 is defined as a ratio of corresponding linear travel speed 225 of front inner wheel 112 to the desired vehicle speed is defined by the following formulas:

$$SD_{FI} = R_{FI}/R_T = (\sqrt{(R_T - 0.5TW^2 + WB^2)})/R_T \quad \text{Formula 9a}$$

$$SD_{FI} = (\sqrt{((WB/\tan(\alpha))^2 + WB^2)})/(0.5TW + WB/\tan(\alpha)) \quad \text{Formula 9b}$$

Finally, the speed differential ($SD_{FO}$)) of front outer wheel 114 is defined as a ratio of corresponding linear travel speed 225 of front outer wheel 114 to the desired vehicle speed is defined by the following formulas:

$$SD_{FO} = R_{FO}/R_T = \sqrt{R_T + 0.5TW^2 + WB^2}/R_T \quad \text{Formula 10a}$$

$$SD_{FO} = (\sqrt{((WB/\tan(\alpha) + TW)^2 + WB^2)})/(0.5TW + WB/\tan(\alpha)) \quad \text{Formula 10b}$$

In other words, each speed differential can be determined based on the turning radius ($R_T$) or, more directly, based on the steering input. It should be noted that a, in the above formulas, represents the turn angle of front inner wheel 112 and corresponds to the steering input. The relationship between the steering input and a depends on the type of steering input and design/geometry of the steering system, which will be understood by one having ordinary skill in the art.

It should be also noted that these speed differentials formulas are developed for a vehicle that has the same track width (TW) on the front and rear axles. One having ordinary skills in the art would understand how to modify these formulas for vehicles with different track widths. The same observation applies to the wheelbase (WB), which can be also changed in some designs and examples. Finally, one having ordinary skills in the art would understand how to modify these formulas for vehicles with fewer (e.g., three) or more (e.g., six) wheels.

Figure 2A:
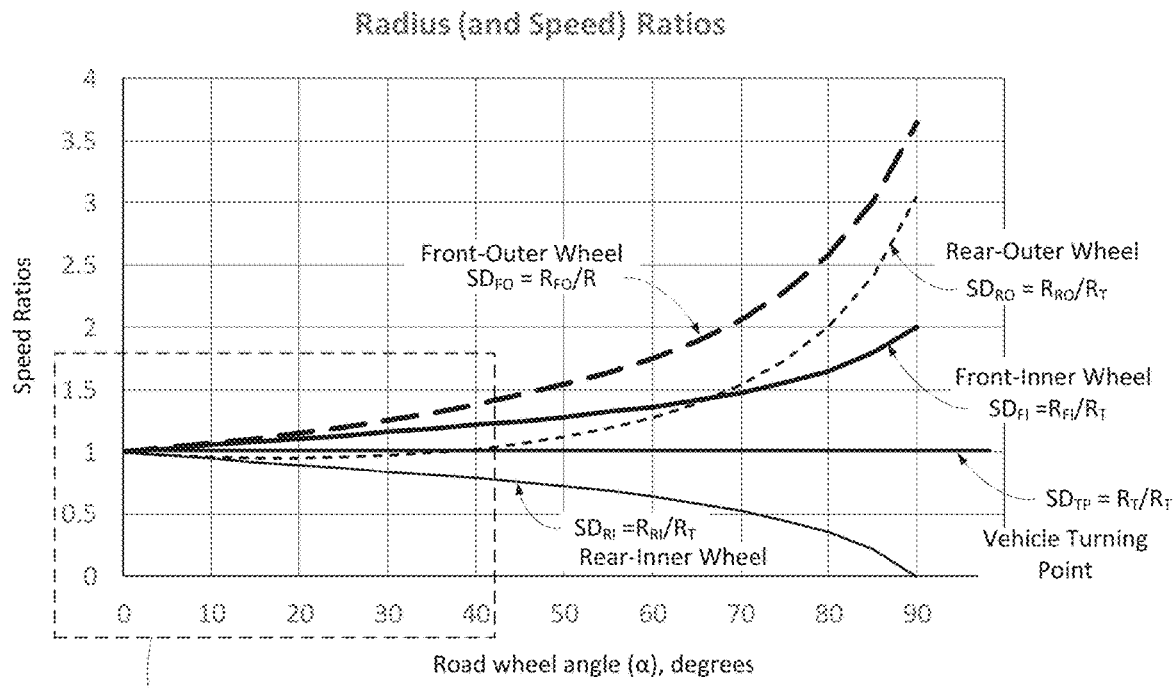
FIGS. 2A and 2B are plots of speed differentials as a function of the road wheel angle, in accordance with some examples.
Figure 2B:
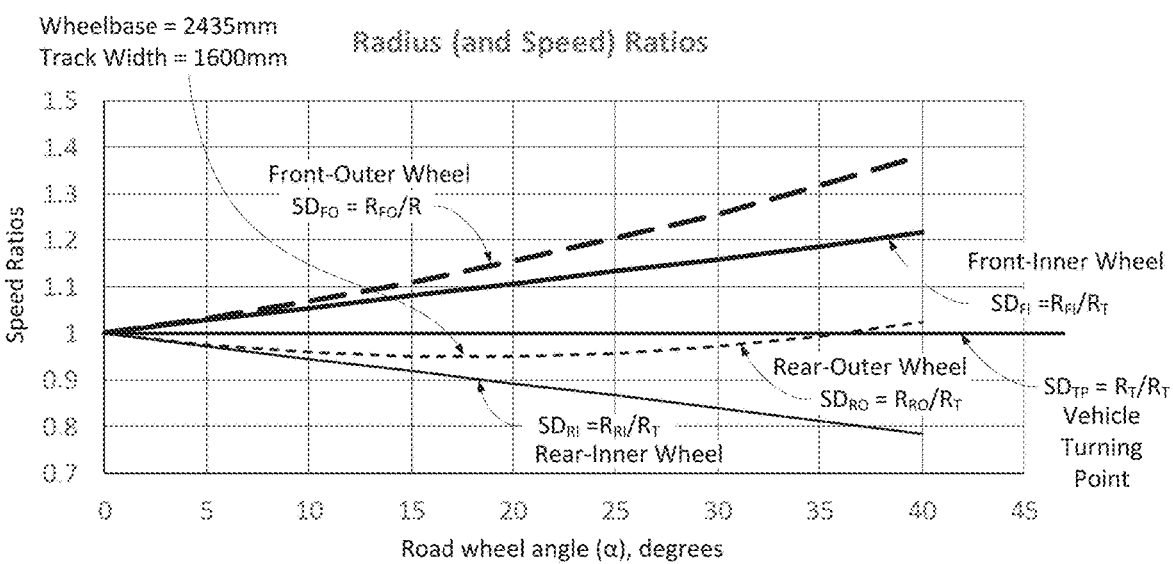

FIGS. 2A and 2B are plots of these speed differentials as a function of the road wheel angle (a) for specific vehicle size. In the example corresponding to these figures, the wheelbase (WB) is 2435 mm, while the track width (TW) is 1600 mm. Vehicle turn point 102 is presented as a reference $SD_{TP} = R_T/R_T = 1$, which corresponds to the desired vehicle speed and is independent of the road wheel angle. Front outer wheel 114 has to travel at a higher speed than any other wheels or vehicle turn point 102 as soon as the vehicle starts turning, i.e., $SD_{FO} > 1$ and any other speed differential, when the steering input deviates from a no-steering baseline and $\alpha > 0°$. Front inner wheel 112 travels at a higher speed than both rear wheels (at least initially) or vehicle turn point 102 when the vehicle is turning. However, at a certain road wheel angle (about 67° in FIG. 2A), the linear travel speeds of rear outer wheel 124 and front inner wheel 112 coincide. At higher road wheel angles (α), rear outer wheel 124 travels faster than front inner wheel 112. This angle depends on the dimensions of the wheelbase (WB) and the track width (TW), which are 2435 mm and 1600 mm, respectively, in this example. Furthermore, rear outer wheel 124 initially travels slower than vehicle turn point 102 (i.e., $SD_{FO}<1$) up until the road wheel angle reaches about 35°. Finally, rear inner wheel 122 travels at a slower speed than any other wheels or vehicle turn point 102 as soon as the vehicle starts turning. In fact, the speed of rear inner wheel 122 is 0 when the road wheel angle reaches 90°, at which point the turn center coincides with rear inner wheel 122. It should be noted that such large road wheel angles are only applicable to slow-moving vehicles such as tractors, forklifts, and the like. The turning angles of fast-moving cars, such as conventional passenger cars and trucks, are limited for safety reasons (e.g., at high speeds, the lateral acceleration generated by even 1° of steering angle exceeds the tire grip).

The linear speed of vehicle turn point 102 is the desired vehicle speed and is determined from the speed input and does not depend on the road wheel angle, at least within the scope of this disclosure and various methods and systems described herein. However, the target linear speed of each wheel is determined as a reference to this desired vehicle speed, e.g., from the speed differentials described above (e.g., by multiplying the desired vehicle speed by the corresponding speed differential to obtain a linear wheel speed corresponding to a geometric no-slip condition in a turn). It should be noted that these geometric no-slip conditions should be distinguished from actual tire slips (relative to the road). For example, the tire may have small actual wheel slips even at geometric no-slip conditions described in this disclosure. However, these actual wheel slips will be a lot smaller (on average) for the geometric no-slip conditions than for conventional systems (e.g., open and locked differentials). These actual wheel slips are caused by the torque applied to each wheel (e.g., vehicle acceleration, vehicle weight) and friction between the tire and the road. Specifically, the same geometric no-slip conditions applied to a heavy accelerating vehicle may result in a greater actual tire slip than in a lighter vehicle that moves at a constant speed. It should be also noted that these geometric no-slip conditions are particularly beneficial to reducing the actual wheel slips when the vehicle is turning.

These speed differentials depend on the road wheel angle (or the vehicles' turning radius that in turn depends on the road wheel angle). Furthermore, these speed differentials depend on the wheelbase (WB) and the track width (TW) of the vehicle, which needs to be known to a wheel-speed controller for determining the target wheel speeds. It should be noted that the wheelbase (WB) and/or the track width (TW) can change during the vehicle operation as further described below.

Each target linear wheel speed is then used to control the rotational speed of a corresponding electric motor, which independently drives one of the vehicle's wheels. One having ordinary skills in the art would recognize that a wheel diameter ($D_W$) is another factor that should be accounted for when converting a target linear wheel speed ($V_L$) to the wheel's rotation speed (ω) as shown by the following formula:

$$\omega = V_L/(\pi \times D_W) \qquad \text{Formula 11}$$

In other words, with the same linear speed (e.g., when the vehicle is not turning), smaller wheels will rotate faster than larger wheels. For simplicity, the rest of the description will focus on the same wheel size.

This process of determining the target wheel speeds and independently controlling all electric motors is frequently repeated such that the speed of each wheel corresponds to the desired vehicle speed without causing any slip conditions. This repetition eliminates the need to monitor for the wheel slip as is commonly done in conventional vehicle traction systems. The wheel speed is adjusted preemptively based on the determined value corresponding to a non-slip condition. It should be noted that this non-slip condition can change based on changes in the steering input. As such, the frequent repetition of this process addresses this and other inputs.

Overall, this electronic differential system accounts for differences in linear wheel speeds and controls the rotation wheel speeds according to reduce the slip between the wheels and the road. Specifically, the system speeds up the outer wheels with respect to the inner wheels and also speeds up the front wheels with respect to the rear. The speed differentials are determined using the steering input (e.g., steering angle), track width, wheelbase, and wheel diameters. This system provides full tractive force (e.g., like a locked differential) but without the scrub and understeer described above. In other words, this electronic differential system eliminates all compromises of conventional mechanical differentials.

It should be noted that this electronic differential system does not need to control the slip since the slip is prevented rather than controlled. The overall vehicle slip (e.g., when a tractor is trying to pull a load that exceeds the total available tractive force) is controlled by the driver and/or other systems. However, up until this total available tractive force limit is reached (where the tractor can't move forward against the drawbar load), the slip at all wheels will be the same This means that torque is being vectored to the wheels with the greatest traction and away from the ones with less traction. However, this torque distribution is performed by preventing the slip through the individual speed control.

In some examples, the steering input is also used for specific speed biasing (e.g., side to side and/or front to back) when the vehicle tows a pivotable coupled load (e.g., a trailer, a farming implement). For example, the speed of the outer wheel can be increased (relative to the calculated values based on speed differentials) by a certain ratio. This ratio can be determined based on the load characteristics (e.g., additional torque required to pull the load).

Figure 3:
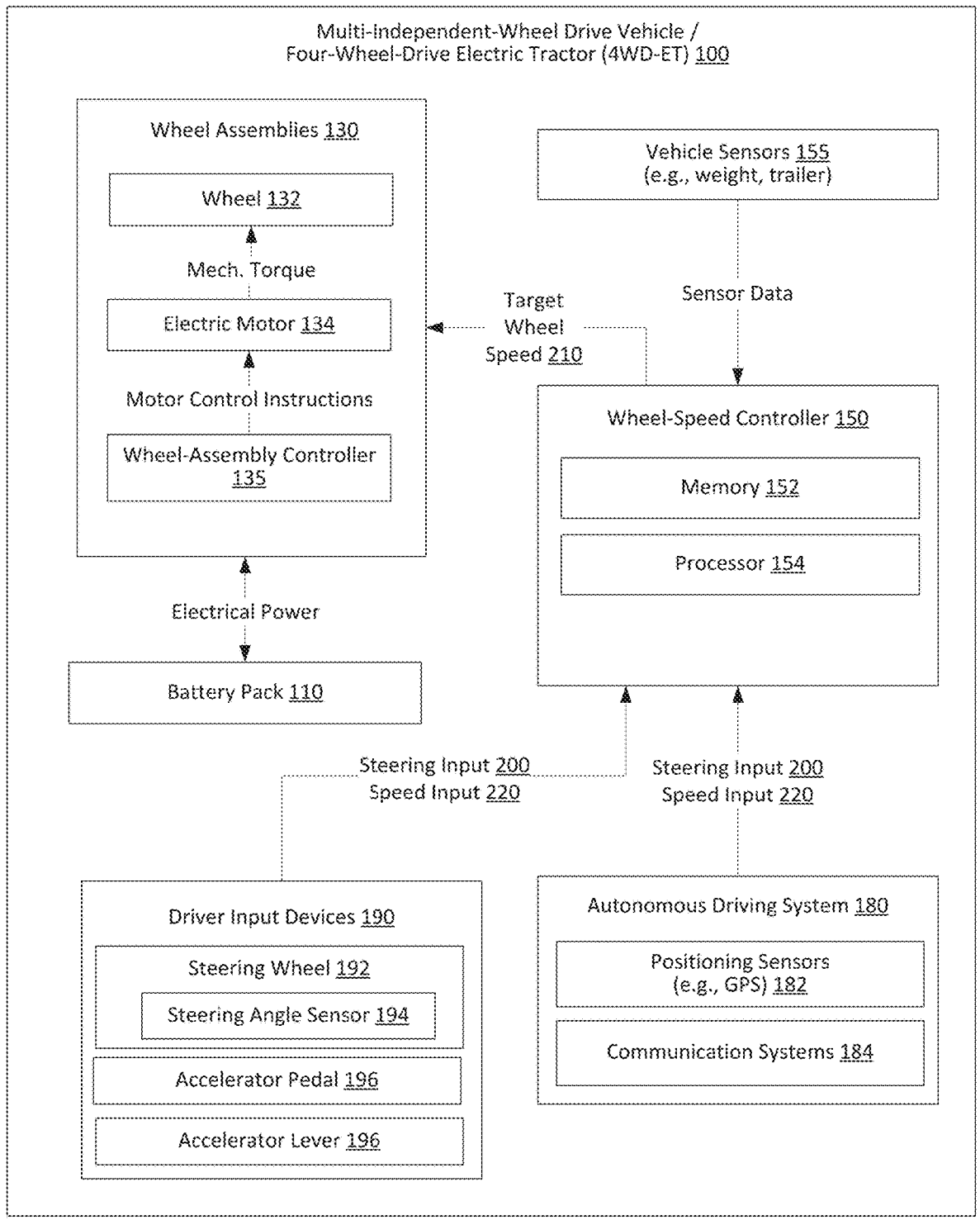
FIG. 3 is a block diagram of a multi-independent-wheel drive vehicle, such as a 4WD-ET, illustrating various vehicle components, in accordance with some examples.

Examples of Multi-Independent-Wheel Drive Vehicles/ Four-Wheel-Drive Electric Tractors FIG. 3 is a block diagram of multi-independent-wheel drive vehicles, such as four-wheel-drive electric tractor (4WD-ET) 100, in accordance with some examples. While the following references will be made to 4WD-ET 100, other types of multi-independent-wheel drive vehicles are also within the scope. Some examples include but are not limited to forklifts, wheel loaders, telehandlers, and mining trucks. The common aspect of such vehicles is having two or more driven wheels, such that the speed of these wheels can be independently controlled by methods and systems described herein. These wheels can be on the same axle and/or different axles.

Returning to FIG. 3, 4WD-ET 100 comprises multiple wheel assemblies 130, such as four wheel assemblies 130. However, any other numbers of wheel assemblies 130 (e.g., two, three, six, eight) are also within the scope. The number of wheel assemblies 130 depends on the number of wheels on a vehicle. For example, a vehicle can be a motorcycle with only two wheels, a tricycle with three wheels, and so on. In some examples, each wheel is a part of a different wheel assembly and is independently driven by this wheel assembly. In additional examples, one or more wheels can be not driven and therefore, not be parts of any wheel assemblies.

Each of these multiple wheel assemblies 130 comprises wheel 132 and electric motor 134 configured to rotate wheel 132 (in this particular wheel assembly) independently from any other wheel assemblies 130. Wheel assemblies 130 can also include gearboxes and other components as further described below with reference to FIGS. 5A-5C. In some examples, each of multiple wheel assemblies 130 also comprises wheel-assembly controller 135.

Overall, the rotation/linear speed of wheel 132 in each wheel assembly is independently controlled. It should be noted that wheels 132 in different wheel assemblies 130 are not mechanically coupled by any vehicle components capable of torque transfer such as differentials, transfer cases, driveshafts, and the like. Instead, the rotation/linear speed of wheel 132 in each wheel assembly is controlled electronically by wheel-speed controller 150 based on various operating conditions of 4WD-ET 100 such as steering input 200 as further described below.

In some examples, all wheels 132 of 4WD-ET 100 have the same diameter. In this example, when 4WD-ET 100 is driven in a straight line (i.e., steering input 200 is at no-steering baseline 205), the same linear travel speed 225 for all wheels 132 translates into the same rotational speed for all wheels 132. As described above with reference to FIGS. 1A-1B and 2A-2B, speed differentials during the vehicle turning represent linear speeds, while electric motors 134 can be controlled using rotational speeds further derived from these speed differentials. As such, the translation of these speed differentials to wheel rotating speeds (for controlling electric motors 134) is performed by at least one component of 4WD-ET 100, such as wheel-speed controller 150 and/or wheel-assembly controller 135.

In other examples, at least two different wheels 132 of 4WD-ET 100 have different diameters. In these examples, the wheel diameters are used to translate speed differentials to wheel rotating speeds or, more specifically, to the rotating speeds of corresponding electric motors 134. For example, wheel 132 in the first one of multiple wheel assemblies 130 has a first diameter $D_1$, while wheel 132 in the second one of multiple wheel assemblies 130 has a second diameter $D_2$ different from the first diameter $D_1$. Briefly referring to FIG. 4A. Front steerable axle 110 of 4WD-ET 100 has smaller-diameter wheels than rear non-steerable axle 120. In these examples, the rotating speed of the first one of multiple wheel assemblies 130 is determined based on the first diameter $D_1$ (in addition to other factors, such as steering input 200), while the rotating speed of the second one of multiple wheel assemblies 130 is further determined based on the second diameter $D_2$. Specifically, when 4WD-ET 100 is driven in a straight line (i.e., steering input 200 is at no-steering baseline 205), a product of the first diameter $D_1$ and the rotational speed of the first one of multiple wheel assemblies 130 is the same as a product of the second diameter $D_2$ and the rotational speed of the second one of multiple wheel assemblies 130.

Figure 5A:
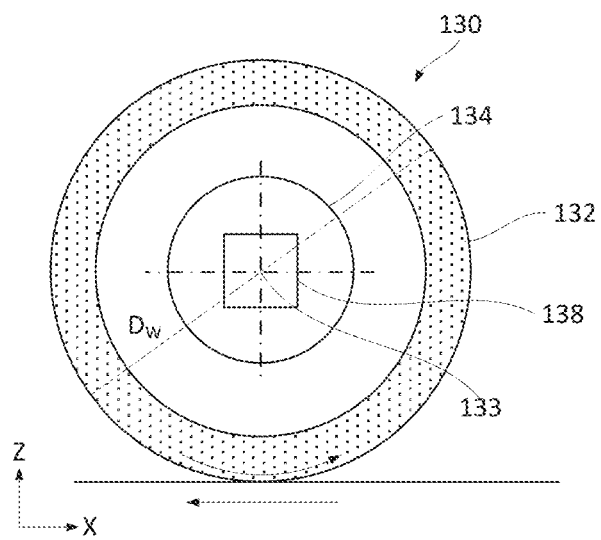
FIGS. 5A-5C are schematic views of a wheel assembly in a multi-independent-wheel drive vehicle, such as a 4WD-ET, in accordance with some examples.
Figure 5B:
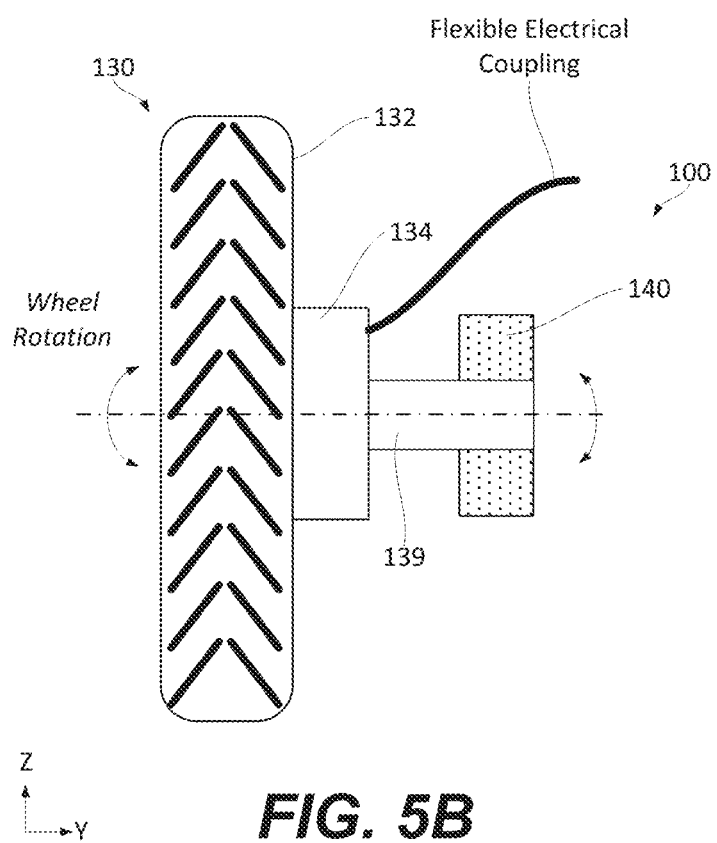
Figure 5C:
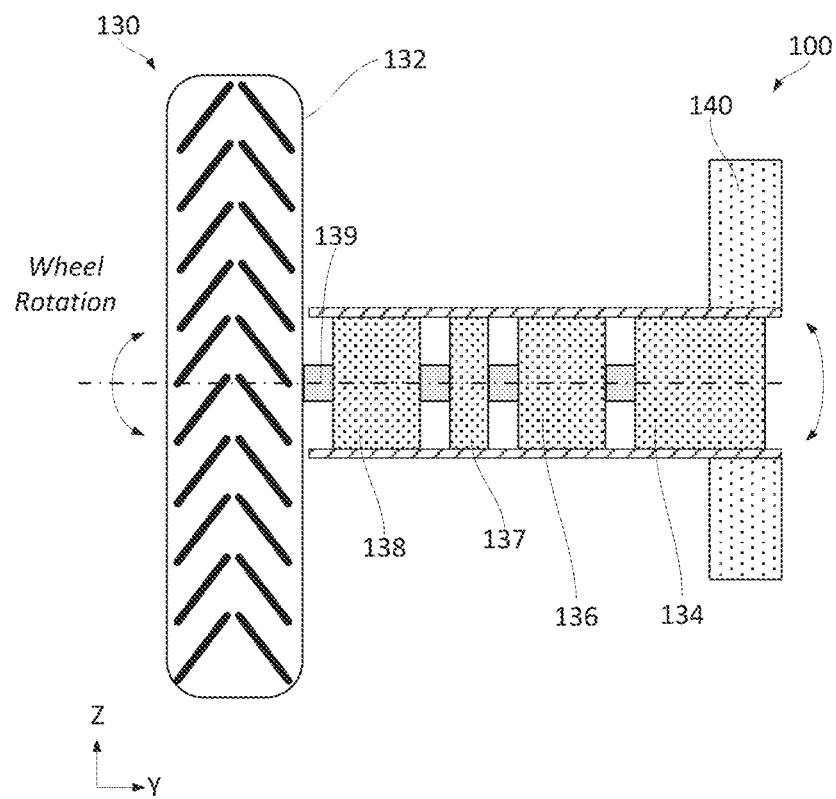

In some examples, electric motor 134 is an in-hub motor as, e.g., is schematically shown in FIGS. 5A-5C. For example, 4WD-ET 100 comprises wheel axle 133 and wheel assembly 130, rotatably coupled to wheel axle 133. Electric motor 134 is configured to rotate wheel 132 relative to wheel axle 133. In other words, wheel axle 133 is not rotatable, which is different from many types of conventional vehicles where axles are rotated to drive the wheel. In the examples shown in FIGS. 5A-5C, wheel axle 133 is coupled to support structure 140 and is used for transferring the reaction torque between electric motor 134 and support structure 170. In some examples, wheel axle 133 has a rectangular cross-section or, more specifically, a square cross-section, e.g., as shown in FIG. 5A.

FIG. 5C illustrates additional components of wheel assembly 130 such as motor-side gearbox 136, brakes 137, wheel-side gearbox 138, and shaft 139. For example, electric motor 134 can drive the first part of shaft 139, coupled to motor-side gearbox 136. Motor-side gearbox 136 allows using a high-speed electric motor. The second part of shaft 139 couples motor-side gearbox 136 to wheel-side gearbox 138. This second part of shaft 139 can be also coupled to brakes 137, which is also coupled to wheel axle 133 and can be used for braking. Finally, the third part of shaft 139 is connected to wheel-side gearbox 138 and wheel 132. In some examples, wheel 132, wheel-side gearbox 138, brakes 137, and one or more parts of shaft 139 are standard parts of a tractor that is converted into 4WD-ET 100 by adding various components described in this disclosure.

Figure 4A:
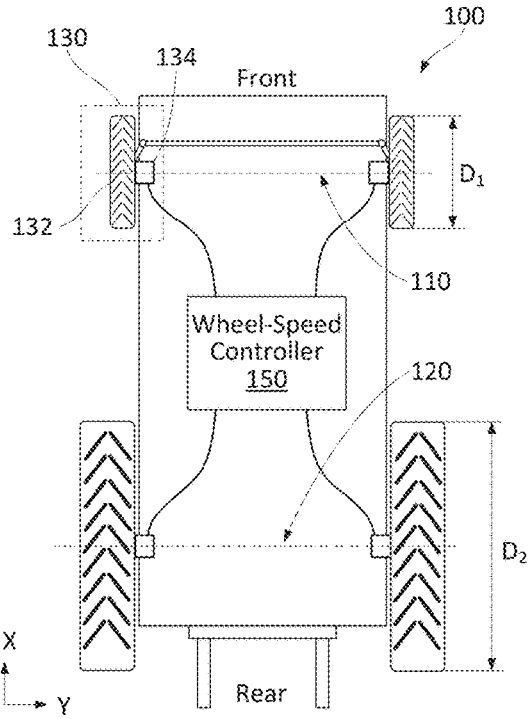
FIG. 4A is a top schematic view of a multi-independent-wheel drive vehicle, such as a 4WD-ET, illustrating a wheel-speed controller transmitting a corresponding target wheel speed to each wheel assembly comprising an electric motor and a wheel, in accordance with some examples.
Figure 4B:
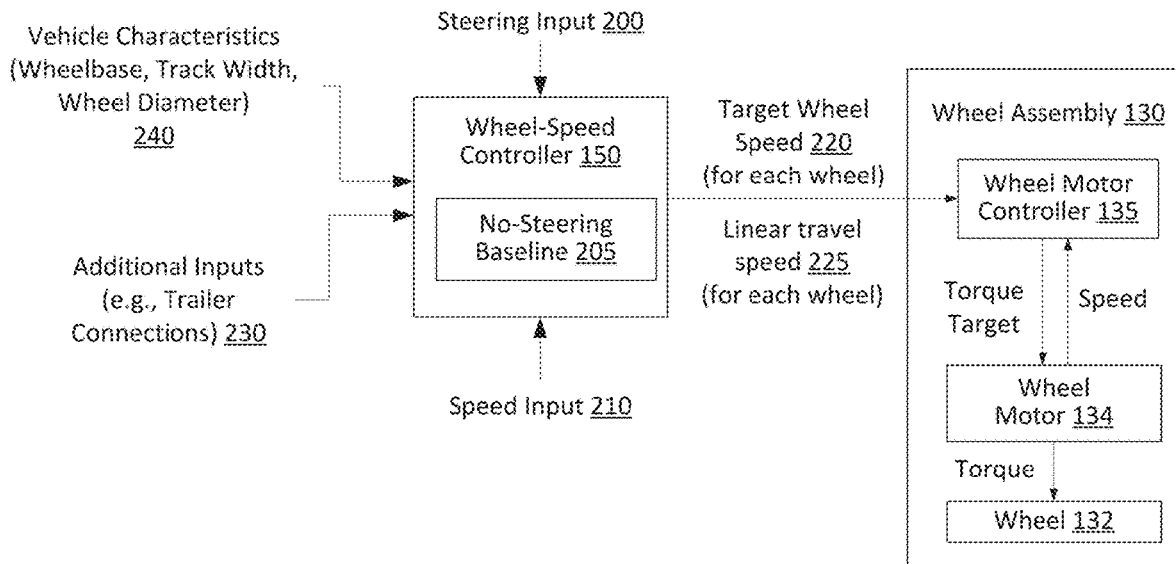
FIG. 4B is a block diagram of various wheel-speed controller inputs and outputs used for the individual wheel speed control in a multi-independent-wheel drive vehicle, such as a 4WD-ET, in accordance with some examples.

Returning to FIG. 3 and as noted above, in some examples, each of multiple wheel assemblies 130 further comprises wheel-assembly controller 135. Wheel-assembly controller 135 is configured to receive target wheel speed 220 from wheel-speed controller 150 and to determine various operating conditions of electric motor 134 to achieve target wheel speed 220. In some examples, wheel-assembly controller 135 monitors the rotational speed of wheel 132 and updates the operating conditions of electric motor 134 to achieve target wheel speed 220 as, e.g., is schematically shown in FIG. 4B. Alternatively, these operating conditions of each electric motor 134 are determined by wheel-speed controller 150.

Overall, 4WD-ET 100 comprises wheel-speed controller 150, which is configured to receive receiving steering input 200, determine target wheel speed 220 for each of multiple wheel assemblies 130 based on steering input 200, and transmit target wheel speed 220 to each of multiple wheel assemblies 130 as, e.g., is schematically shown in FIG. 4B. Additional aspects of these functions of wheel-speed controller 150 are described below with reference to FIG. 6. It should be noted that target wheel speed 220 (for each of multiple wheel assemblies 130) has a corresponding linear travel speed 225 for this wheel assemblies 130. It should be also noted that target wheel speed 220 can be a linear speed or a rotational speed (in which case, the diameter of the corresponding wheel is accounted for). The corresponding linear travel speed 225 of any two multiple wheel assemblies 130 is different when steering input 200 deviates from no-steering baseline 205 (i.e., when 4WD-ET 100 turns). Furthermore, the corresponding linear travel speed 225 of any two multiple wheel assemblies 130 is the same when steering input 200 is at no-steering baseline 205 (e.g., when 4WD-ET 100 is driven in a straight line).

In some examples, wheel-speed controller 150 comprises memory 152 and processor 154. Memory 152 can store various characteristics of 4WD-ET 100, such as the track width (TW), the wheelbase (WB), and/or the wheel diameters. Processor 154 can include a microprocessor, an application-specific integrated circuit, and the like and can be configured to execute computer-readable instructions stored on memory 152. Memory 152 includes read-only memory (ROM) and random-access memory (RAM). Memory 152 may be included in an operating system and various instructions (e.g., computer-readable instructions, applications, data, program modules) for controlling the above-referenced components and performing various operations of 4WD-ET 100/Specifically, wheel-speed controller 150 may be connected to and control operations of all of the wheel assemblies 130 while receiving input from driver input devices 190 (e.g., steering wheel 192, accelerator pedal 196, accelerator lever 198). For example, steering wheel 192 comprises steering angle sensor 194, which sends steering input 200 to wheel-speed controller 150. In the same or other examples, accelerator pedal 196 and/or accelerator lever 198 send speed input 220 to wheel-speed controller 150. Other inputs to wheel-speed controller 150 can come from various sensors 155, such as a trailer hook-up sensor, weight sensor, and the like.

In some examples, 4WD-ET 100 is an autonomous vehicle comprising autonomous driving system 180. Autonomous driving system 180 can provide steering input 200 and speed input 220 to wheel-speed controller 150. Autonomous driving system 180 can comprise various positioning sensors 182 (e.g., global positioning sensor). In some examples, autonomous driving system 180 also comprises communication system 184 for communicating with other vehicles and/or systems. Communication system 184 can include circuitry and instructions for forming communication channels between 4WD-ET 100 and other external devices, e.g., other EVs, computer systems, cloud servers, or the like. Various types of communication channels are within the scope, such as Global System for Mobile (GSM), General Packet Radio Service (GPRS), Enhanced Data Rates for GSM Evolution (EDGE), High-Speed Downlink Packet Access (HSDPA), Long-Term Evolution (LTE), Code-division multiple access (CDMA), Wideband Code-division multiple access (WCDMA), User Datagram Protocol (UDP), Transmission Control Protocol/Internet Protocol (TCP/IP), Short Message Service (SMS), Wireless Application Protocol (WAP), Ultra-wideband (UWB), Worldwide Interoperability for Microwave Access (WiMAX), Session Initiation Protocol Real-time Transport Protocol (SIP/RTP), or any of a variety of other communication protocols. In some examples, communication system 184 may be used to form a peer-to-peer network or a wireless local area network with other EVs, computer systems, or the like. Communication system 184 may be used to send the status data or the likes from 4WD-ET 100 to one or more external systems and may be used to receive task assignments, navigation instructions, global positioning system (GPS) location information, or the likes at 4WD-ET 100.

Figure 6:
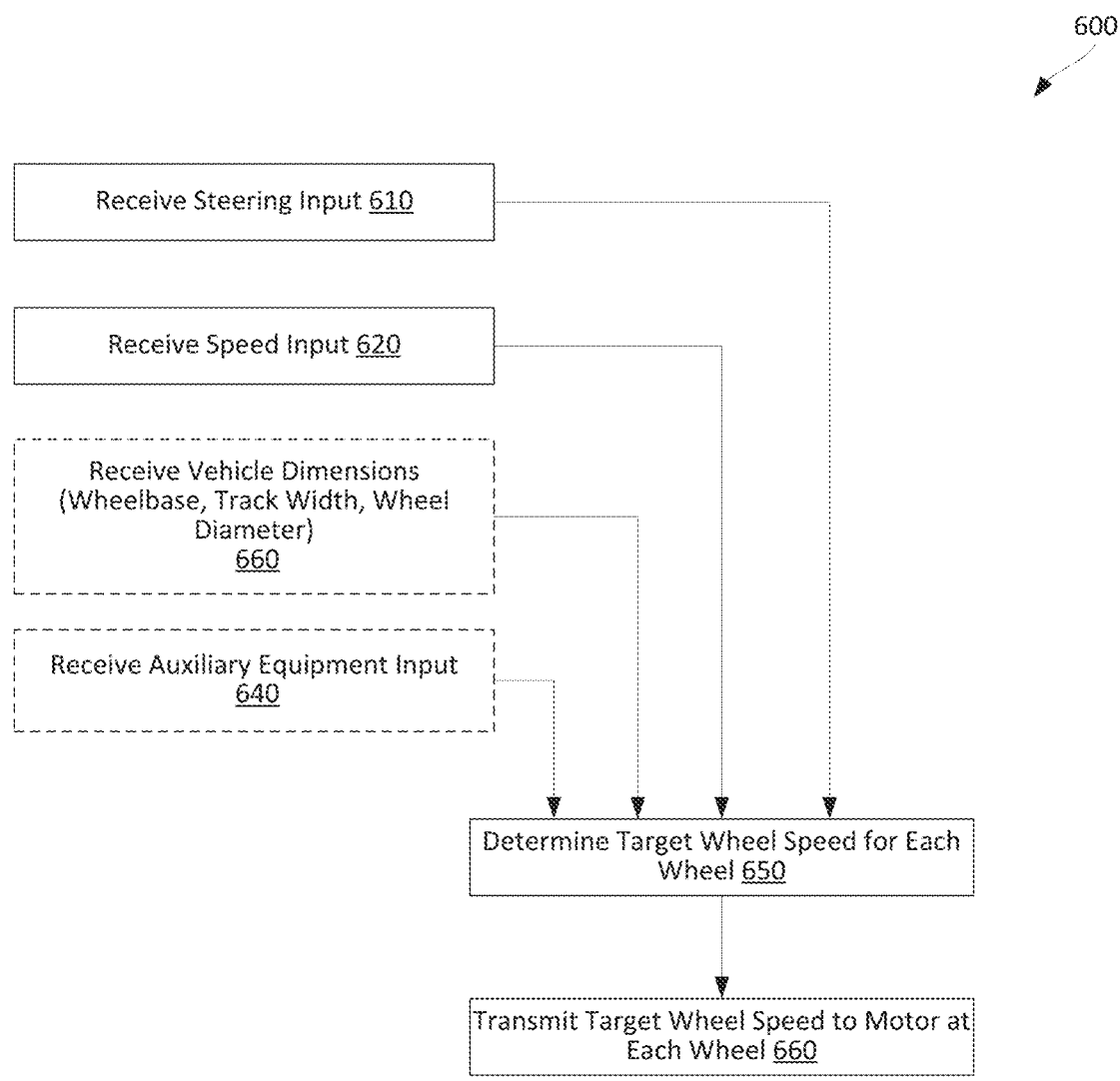
FIG. 6 is a process flowchart corresponding to a method of controlling individual wheel speeds in a multi-independent-wheel drive vehicle, such as a 4WD-ET, in accordance with some examples.

Examples of Controlling Individual Wheel Speeds in Multi-Independent-Wheel Drive Vehicles/Four-Wheel-Drive Electric Tractors FIG. 6 is a process flowchart corresponding to method 600 of controlling individual wheel speeds in multi-independent-wheel drive vehicles, such as 4WD-ET 100, in accordance with some examples. Various aspects and features of such vehicles are described above. Method 600 comprises receiving (block 610) steering input 200 at wheel-speed controller 150. In some examples, steering input 200 is a steering wheel angle, provided from a steering angle sensor 194. In some examples, 4WD-ET 100 is an autonomous vehicle comprising an autonomous driving system 180, providing steering input 200. In either case, steering input 200 corresponds to a certain angle of steerable wheels, which was described above with reference to FIG. 1B.

In some examples, method 600 also comprises receiving (block 620) speed input 210 at wheel-speed controller 150. For example, speed input 210 can be provided by one or more of an accelerator pedal position, an accelerator lever position, and an autonomous-driving-system speed input. A combination of steering input 200 and speed input 210 can be used to determine target wheel speed 220 for each of multiple wheel assemblies 130. In some examples, speed input 210 is not provided to wheel-speed controller 150. In this example, target wheel speed 220 is a relative speed (which can be later converted to specific motor control instructions at each wheel assembly 130).

In some examples, method 600 also comprises receiving (block 630), at wheel-speed controller 150, various characteristics of 4WD-ET 100 such as the track width (TW), the wheelbase (WB), and/or the wheel diameters. Specifically, some of these characteristics may be variable/adjustable. For example, the vehicle's wheels can be replaced with wheels having different offsets thereby changing the track width (TW). Changing the wheel diameter changes the relationship between the linear and rotational wheel speeds.

In some examples, method 600 also comprises receiving (block 640) auxiliary equipment input at wheel-speed controller 150. For example, auxiliary equipment input can indicate that a trailer is connected to 4WD-ET 100. The speed biasing aspects related to this example are described below with reference to FIG. 7.

Method 600 also comprises determining (block 650), at wheel-speed controller 150, target wheel speed 220 for each of multiple wheel assemblies 130, based on at least steering input 200. Target wheel speed 220 can take various forms, such as the rotational speed of a corresponding wheel, a linear wheel speed, relative linear speeds, and the like. Target wheel speeds 220 are then used by multiple wheel assemblies 130 to generate specific instructions for operating electric motors 134. In either case, target wheel speed 220 has a corresponding linear travel speed 225 for this wheel assembly 130 or, more specifically, linear travel speed 225 of the wheel ground-contact point in this wheel assembly 130. First, linear travel speed 225 is independent from the wheel diameters. Second, linear travel speed 225 can be directly compared with the desired speed of 4WD-ET 100 (which corresponds to vehicle turn point 102) when determining speed differentials as described with reference to FIGS. 1A-1B and 2A-2B. It should be noted that the desired vehicle speed is linear and does not have a rotational equivalent.

The difference between linear travel speeds 225 depends on steering input 200. Corresponding linear travel speeds 225 of any two of wheel assemblies 130 are different when steering input 200 deviates from no-steering baseline 205. In this example, 4WD-ET 100 is turning, and different wheels follow different paths and have different linear speeds as described above. On the other hand, when steering input 200 is at no-steering baseline 205 (i.e., 4WD-ET 100 is turning), the corresponding linear travel speeds 225 of any two wheel assemblies 130 are the same. In this example, 4WD-ET 100 is traveling in a straight line and all points of 4WD-ET 100 have the same linear speed (which is the same as the desired vehicle speed).

In some examples, target wheel speed 220 for each of multiple wheel assemblies 130 is further determined based on speed input 210. In other words, the desired vehicle speed is accounted for when target wheel speeds 220 are determined. However, this operation is optional.

Instead, the desired vehicle speed can be used directly by multiple wheel assemblies 130 to determine operating instructions for electric motors 134 based on target wheel speeds 220 (that are independent of the desired vehicle speed). In either case, target wheel speeds 220 depend on steering input 200.

In some examples, target wheel speed 220 and corresponding linear travel speed 225 are the same. In these examples, the rotational speed of each wheel is performed at each wheel assembly 130. These calculations account for each wheel's diameter.

In some examples, the target wheel speed 220 is a rotational speed. In these examples, wheel-speed controller 150 takes into account each wheel's diameter when determining the corresponding rotational speed, e.g., a corresponding linear speed is divided by the wheel diameter. For example, wheel 132 in the first one of multiple wheel assemblies 130 has a first diameter $D_1$, while the second one of multiple wheel assemblies 130 has a second diameter $D_2$, different from the first diameter $D_1$ as, e.g., is schematically shown in FIG. 4A. In this example, target wheel speed 220 for the first one of multiple wheel assemblies 130 is further determined based on the first diameter $D_1$ (e.g., a corresponding linear speed is divided by the first diameter $D_1$), while the target wheel speed 220 for the second one of multiple wheel assemblies 130 is further determined based on the second diameter $D_2$ (e.g., a corresponding linear speed is divided by the second diameter $D_2$). In a more specific example, when steering input 200 is at no-steering baseline 205 and 4WD-ET 100 is traveling in a straight line, the linear speeds of all wheels are the same. In other words, the product of the first diameter $D_1$ and target wheel speed 220 (i.e., the rotational speed in this example) of the first one of multiple wheel assemblies 130 is the same as the product of the second diameter $D_2$ and the target wheel speed 220 (i.e., also the rotational speed in this example) of the second one of multiple wheel assemblies 130.

As noted above and with reference to FIG. 1B, 4WD-ET 100 has a track width (TW) and a wheelbase (WB). Target wheel speed 220 for each wheel assembly 130 is further determined based on the track width (TW) and the wheelbase (WB) when steering input 200 deviates from no-steering baseline 205 (i.e., when 4WD-ET 100 is turning). Specifically, 4WD-ET 100 comprises front steerable axle 110 and rear non-steerable axle 120 separated by the wheelbase (WB). Vehicle turn point 102 is defined as a point positioned at the center of rear non-steerable axle 120. Vehicle turn point 102 is associated with the desired speed of four-wheel-drive electric tractor 100 and can be also referred to as a vehicle speed reference point since different points of 4WD-ET 100 travel at different linear speeds when 4WD-ET 100 is turning. More specifically, when steering input 200 deviates from no-steering baseline 205, 4WD-ET 100 turns around its turn center defined by a turning radius ($R_T$) extending between the turn center and vehicle turn point 102. This turning radius ($R_T$) is a function of track width (TW), wheelbase (WB), and steering input 200. Specifically, a vehicle with a shorter wheelbase (WB) will have a smaller turning radius ($R_T$) than a vehicle with a longer wheelbase (WB). A larger angle of turning wheels will translate into a smaller turning radius ($R_T$). In some examples, turning radius ($R_T$) is defined by the formula $R_T = 0.5 \, TW + WB/\tan \alpha$, where $\alpha$ is a turn angle of front inner wheel 112 corresponding to steering input 200. The relationship between steering input 200 and this turn angle ($\alpha$) depends on the design of the vehicle's steering system and will be readily understood by one having ordinary skill in the art.

As noted above with reference to FIGS. 1A and 1B, front steerable axle 110 comprises front inner wheel 112 and front outer wheel 114 offset from front inner wheel 112 by the track width (TW) and positioned further away from the turn center than front inner wheel 112. Rear non-steerable axle 120 comprises rear inner wheel 122 and rear outer wheel 124 offset from rear inner wheel 122 by the track width (TW) and positioned further away from the turn center than rear inner wheel 122.

Target wheel speed 220 determined by wheel-speed controller 150 can take various forms as noted above. One form is a speed differential, which is defined as a linear speed ratio of the corresponding wheel to vehicle turn point 102. It should be noted that the linear speed of vehicle turn point 102 is the desired speed of 4WD-ET 100. These speed differentials are the same as linear travel ratios of corresponding points of 4WD-ET 100 or as turning radius ratios of different points. Various examples of these speed differentials are presented above with reference to FIGS. 1A-1B and 2A-2B.

In some examples, each one of speed differential $SD_{RI}$ of rear inner wheel 122, speed differential $SD_{FO}$ of rear outer wheel 124, speed differential $SD_{FI}$ of front inner wheel 112, and speed differential $SD_{FO}$ of front outer wheel 114 has a non-linear relationship to steering input 200. A specific example can be seen in FIGS. 2A-2B and described above. Furthermore, in some examples, the profile of speed differential $SD_{FO}$ of rear outer wheel 124 as a function of steering input 200 has a minimum defined by track width TW and wheelbase WB of 4WD-ET 100.

Method 600 also comprises transmitting (block 660) target wheel speed 220 to each of multiple wheel assemblies 130. Each wheel assembly 130 then uses this target wheel speed 220 to control the rotation speed of the corresponding wheel 132.

In some examples, receiving steering input 200, determining target wheel speed 220, and transmitting target wheel speed 220 are performed repeatedly at a set frequency, e.g., between 1 Hz and 100 Hz or, more specifically, between 5 Hz and 50 Hz. This set frequency may depend on steering input 200 (or, more specifically, on the rate of change of steering input 200) and speed input 210. For example, the faster the steering input 200 changes and/or the faster 4WD-ET 100 moves, the more frequently the above-listed operations are repeated. This repetition eliminates the need for slip feedback since wheel-speed controller 150 continuously instructs multiple wheel assemblies 130 to operate at no-slip geometric conditions. It should be noted that these no-slip geometric conditions should be distinguished from actual tire slips (relative to the road). For example, the tire may have small actual wheel slips even at no-slip geometric conditions described in this disclosure. However, these actual wheel slips will be a lot smaller (on average) for the no-slip geometric conditions than for conventional systems (e.g., open and locked differentials). These actual wheel slips are caused by the torque applied to each wheel (e.g., vehicle acceleration, vehicle weight) and friction between the tire and the road. Specifically, the same no-slip geometric conditions a heavy accelerating vehicle may have a greater actual tire slip than a lighter vehicle moving at a constant speed. It should be also noted that these no-slip geometric conditions are particularly beneficial to reduce the actual wheel slips when the vehicle is turning.

Figure 7:
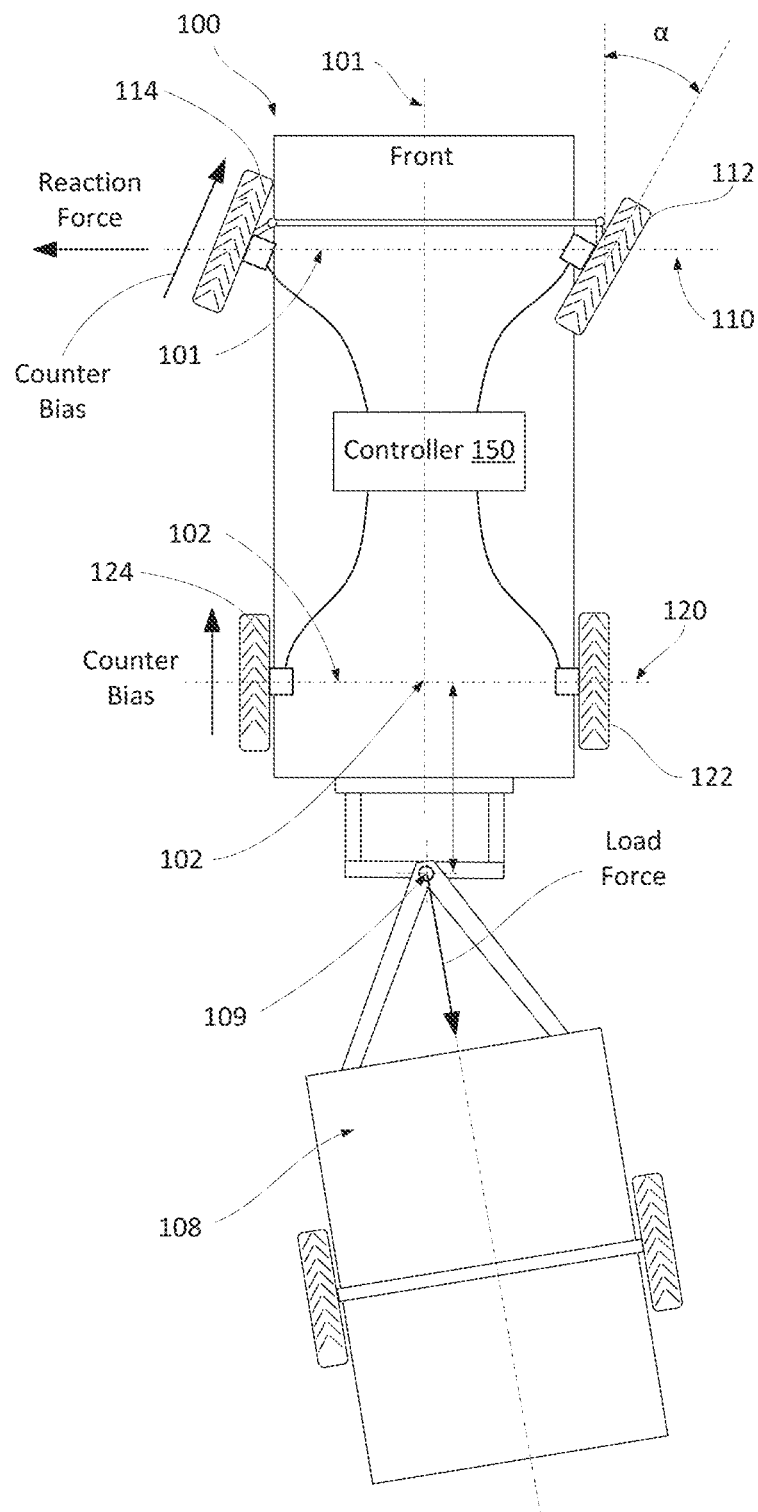
FIG. 7 is a top schematic view of a multi-independent-wheel drive vehicle, such as a 4WD-ET, with a pivotably-coupled load towed by the vehicle, in accordance with some examples.

In some examples, method 600 comprises determining target wheel speeds 220 based on the presence or absence of pivotably-coupled load 108 as will now be described with reference to FIG. 7. Specifically, pivotably-coupled load 108 connected to 4WD-ET 100 tends to straight 4WD-ET 100 when 4WD-ET 100 is trying to turn. The reaction force (shown in FIG. 7) is a function of the load force and the overall geometry of 4WD-ET 100 and pivotably-coupled load 108. One key element of this geometry is the distance between rear non-steerable axle 120 and pivotable coupling point between 4WD-ET 100 and pivotably-coupled load 108. Depending on the reaction force or the factors causing this reaction force, the speed of some wheels can be biased. For example, the speed of the outer wheels (e.g., front outer wheel 114 and rear outer wheel 124) can be increased. In the same or other examples, the speed of the inner wheels (e.g., front inner wheel 112 and rear outer wheel 122) can be decreased. The level of biasing case depends on the reaction force or the factors causing this reaction force and can up to +/−10%, or more specifically, up to +/−5% or even up to +/−2%).

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered illustrative and not restrictive.

What is claimed is:

1. A method of controlling individual wheel speeds in a four-wheel-drive electric tractor comprising a wheel-speed controller and multiple wheel assemblies, the method comprising:
    receiving a steering input at the wheel-speed controller;
    determining, at the wheel-speed controller, a target wheel speed for each of the multiple wheel assemblies, based on the steering input; wherein:
        each of the multiple wheel assemblies comprises a wheel and an electric motor rotating the wheel independently from any other of the multiple wheel assemblies,
        the target wheel speed has a corresponding linear travel speed for each of the multiple wheel assemblies,
        the corresponding linear travel speed of any two of the multiple wheel assemblies is different when the steering input deviates from a no-steering baseline, and
        the corresponding linear travel speed of any two of the multiple wheel assemblies is the same when the steering input is at the no-steering baseline; and
    transmitting the target wheel speed to each of the multiple wheel assemblies, wherein:
        the target wheel speed is a rotational speed,
        the wheel in a first one of the multiple wheel assemblies has a first diameter ($D_1$),
        the wheel in a second one of the multiple wheel assemblies has a second diameter ($D_2$) different from the first diameter ($D_1$),
        the target wheel speed of the first one of the multiple wheel assemblies is further determined based on the first diameter ($D_1$), and
        the target wheel speed of the second one of the multiple wheel assemblies is further determined based on the second diameter ($D_2$).

2. The method of claim 1, wherein the steering input is a steering wheel angle, provided by a steering angle sensor.

3. The method of claim 1, wherein the four-wheel-drive electric tractor is an autonomous vehicle comprising an autonomous driving system, providing the steering input.

4. The method of claim 1, further comprising receiving a speed input at the wheel-speed controller, wherein the target wheel speed for each of the multiple wheel assemblies is further determined based on the speed input.

5. The method of claim 4, wherein the speed input is one or more of an accelerator pedal position, an accelerator lever position, and an autonomous-driving-system speed input.

6. The method of claim 1, wherein the target wheel speed and the corresponding linear travel speed are the same.

7. The method of claim 1, wherein, when the steering input is at the no-steering baseline, a product of the first diameter ($D_1$) and the target wheel speed of the first one of the multiple wheel assemblies is the same as a product of the second diameter ($D_2$) and the target wheel speed of the second one of the multiple wheel assemblies.

8. The method of claim 1, wherein:
    the four-wheel-drive electric tractor has a track width (TW) and a wheelbase (WB), and
    the target wheel speed for each of the multiple wheel assemblies is further determined based on the track width and the wheelbase of the four-wheel-drive electric tractor when the steering input deviates from the no-steering baseline.

9. The method of claim 8, wherein:
    the four-wheel-drive electric tractor comprises a front steerable axle, a rear non-steerable axle separated by the wheelbase (WB), and a vehicle turn point positioned at a center of the rear non-steerable axle and associated with a desired speed of the four-wheel-drive electric tractor,
    when the steering input deviates from the no-steering baseline, the four-wheel-drive electric tractor turns around a turn center defined by a turning radius ($R_T$) extending between the turn center and the vehicle turn point
    the front steerable axle comprises a front inner wheel and a front outer wheel offset from the front inner wheel by the track width (TW) and positioned further away from the turn center than the front inner wheel,
    the rear non-steerable axle comprises a rear inner wheel and a rear outer wheel offset from the rear inner wheel by the track width (TW) and positioned further away from the turn center than the rear inner wheel,
    the turning radius ($R_T$) is a function of the track width, the wheelbase, and the steering input.

10. The method of claim 1, wherein:
    each of the multiple wheel assemblies further comprises a wheel-assembly controller receiving the target wheel speed from the wheel-speed controller, and
    the wheel-assembly controller determines the operating conditions of each of the multiple wheel assemblies to achieve the target wheel speed.

11. The method of claim 10, wherein the wheel-assembly controller monitors a rotational speed of the wheel and updates the operating conditions of the electric motor to achieve the target wheel speed.

12. The method of claim 1, wherein the electric motor is an in-hub motor.

13. The method of claim 1, wherein receiving the steering input, determining the target wheel speed, and transmitting the target wheel speed are performed repeatedly at a set frequency.

14. The method of claim 13, wherein the set frequency depends on at least one of the steering input and a speed input.

15. A method comprising:
    receiving a steering input at a wheel-speed controller of a four-wheel-drive electric tractor;

determining, at the wheel-speed controller, a target wheel speed for each of multiple wheel assemblies, based on the steering input; wherein:
- when the steering input deviates from a no-steering baseline, the four-wheel-drive electric tractor turns around a turn center defined by a turning radius ($R_T$) extending between a turn center and a vehicle turn point
- a front steerable axle of the four-wheel-drive electric tractor comprises a front inner wheel and a front outer wheel offset from the front inner wheel by a track width (TW) and positioned further away from the turn center than the front inner wheel,
- a rear non-steerable axle of the four-wheel-drive electric tractor comprises a rear inner wheel and a rear outer wheel offset from the rear inner wheel by the track width (TW) and positioned further away from the turn center than the rear inner wheel, the front steerable axle and rear non-steerable axle are separated by a wheelbase (WB) and
- the turning radius ($R_T$) is defined by a formula $R_T$=0.5 TW+WB/tan($\alpha$), where $\alpha$ is a turn angle of the front inner wheel, corresponding to the steering input; and transmitting the target wheel speed to each of the multiple wheel assemblies.

16. The method of claim 15, wherein:
- a speed differential ($SD_{RI}$) of the rear inner wheel is defined as a ratio of a corresponding linear travel speed of the rear inner wheel to a desired speed of the four-wheel-drive electric tractor is defined by a formula $SD_{RI}$=1−0.5 TW/$R_T$,
- a speed differential ($SD_{RO}$) of the rear outer wheel is defined as a ratio of a corresponding linear travel speed of the rear outer wheel to the desired speed of the four-wheel-drive electric tractor is defined by a formula $SD_{RO}$=1+0.5 TW/$R_T$,
- a speed differential ($SD_{FI}$) of the front inner wheel is defined as a ratio of a corresponding linear travel speed of the front inner wheel to the desired speed of the four-wheel-drive electric tractor is defined by a formula $SD_{FI}$=($\sqrt{((R_T-0.5 \text{ TW})^2+WB^2)})/R_T$, and
- a speed differential ($SD_{FO}$) of the front outer wheel is defined as a ratio of a corresponding linear travel speed of the front outer wheel to the desired speed of the four-wheel-drive electric tractor is defined by a formula $SD_{FO}$=($\sqrt{((R_T+0.5 \text{ TW})^2+WB^2)})/R_T$.

17. The method of claim 16, wherein each of the speed differential ($SD_{RI}$) of the rear inner wheel, the speed differential ($SD_{RO}$) of the rear outer wheel, the speed differential ($SD_{FI}$) of the front inner wheel, and the speed differential ($SD_{FO}$) of the front outer wheel has a non-linear relationship to the steering input.

18. The method of claim 16, wherein a profile of the speed differential ($SD_{RO}$) of the rear outer wheel as a function of the steering input has a minimum defined by the track width (TW) and the wheelbase (WB) of the four-wheel-drive electric tractor.

19. A four-wheel-drive electric tractor comprising:
multiple wheel assemblies, each comprising:
- a wheel, and
- an electric motor configured to rotate the wheel independently from any other of the multiple wheel assemblies; and
- a wheel-speed controller configured to receive receiving a steering input, to determine a target wheel speed for each of the multiple wheel assemblies based on the steering input, and to transmit the target wheel speed to each of the multiple wheel assemblies, wherein:
  - the target wheel speed has a corresponding linear travel speed for each of the multiple wheel assemblies,
  - the corresponding linear travel speed of any two of the multiple wheel assemblies is different when the steering input deviates from a no-steering baseline,
  - the corresponding linear travel speed of any two of the multiple wheel assemblies is the same when the steering input is at the no-steering baseline,
  - the target wheel speed is a rotational speed,
  - the wheel in a first one of the multiple wheel assemblies has a first diameter ($D_1$),
  - the wheel in a second one of the multiple wheel assemblies has a second diameter ($D_2$) different from the first diameter ($D_1$),
  - the target wheel speed of the first one of the multiple wheel assemblies is further determined based on the first diameter ($D_1$), and
  - the target wheel speed of the second one of the multiple wheel assemblies is further determined based on the second diameter ($D_2$).

20. The four-wheel-drive electric tractor of claim 19, wherein the steering input is a steering wheel angle, provided by a steering angle sensor.

* * * * *